United States Patent [19]
Ohara

[11] Patent Number: 5,822,508
[45] Date of Patent: Oct. 13, 1998

[54] IMAGE DATA TRANSFER SYSTEM FOR IMAGE CAPTURING DEVICE

[75] Inventor: Kiyotaka Ohara, Nagoya, Japan

[73] Assignee: Brother Kogyo Kabushiki Kaisha, Nagoya, Japan

[21] Appl. No.: 650,446

[22] Filed: May 20, 1996

[30]    Foreign Application Priority Data

May 19, 1995   [JP]   Japan .................................. 7-145406

[51] Int. Cl.⁶ ................................................... G06F 15/00
[52] U.S. Cl. .......................................... 395/114; 395/117
[58] Field of Search .................................. 395/101, 106, 395/109, 112, 113, 114, 115, 117, 200.3, 200.31, 200.32, 200.35, 200.51, 200.58, 200.68; 358/500, 530, 540, 400, 401, 407, 408, 436, 442, 448, 468; 370/229, 230, 235, 264, 270, 282

[56]          References Cited

U.S. PATENT DOCUMENTS

| | | | |
|---|---|---|---|
| H1677 | 9/1997 | Hu et al. .................................. | 358/468 |
| 4,947,345 | 8/1990 | Paradise et al. ........................ | 358/442 |
| 4,989,163 | 1/1991 | Kawamata et al. ..................... | 395/106 |
| 5,163,125 | 11/1992 | Okada ..................................... | 395/115 |
| 5,396,345 | 3/1995 | Motoyama .............................. | 358/448 |
| 5,425,135 | 6/1995 | Motoyama et al. .................... | 395/114 |

FOREIGN PATENT DOCUMENTS

A-1-256860  10/1989  Japan .

*Primary Examiner*—David K. Moore
*Assistant Examiner*—Gabriel I. Garcia
*Attorney, Agent, or Firm*—Oliff & Berridge, PLC

[57]                ABSTRACT

In an arrangement where a host computer and a printer are connected to an image scanner, a data transfer control (DTC) circuit selectively transmits image data produced from the image scanner to either the host computer or the printer according to a transfer mode set in the DTC circuit. The DTC circuit is selectively set to either one of a first, second, and third transfer modes. In the first transfer mode, image data sent from the host computer is sent to the printer via the image scanner. In the second transfer mode, image data captured by the image scanner is sent to the host computer. In the third transfer mode, the image data captured by the image scanner is sent to the printer for printing.

14 Claims, 9 Drawing Sheets

IMAGE DATA TRANSFER SYSTEM FOR IMAGE CAPTURING DEVICE

BACKGROUND OF THE INVENTION

1. Field of the Invention

The present invention relates to an image data transfer system for an image capturing device, and more particularly to an image data transfer system for connecting an image capturing device to selective one of a host computer and a printer.

2. Description of the Related Art

Image capturing devices, such as an image scanner, optically read images on an information sheet and output image data to, for example, a personal computer. The image scanner is typically provided with a connector exclusively used for connection to the personal computer using a connection cable.

On the other hand, the personal computer is capable of receiving the image data from the image scanner and is also capable of transmitting the image data to a printer. The image data transmitted to the printer may be produced by the personal computer per se or the one transferred from the image scanner.

Typically, personal computers are provided with a single Centronics connector and a Centronics communication port. The Centronics connector is provided for transmitting and receiving parallel data to and from an external device. So that the personal computer may receive image data from an image scanner, the personal computer and the image scanner are connected using a connection cable wherein one end of the cable is connected to the Centronics connector of the personal computer and the other end thereof to the communication connector of the image scanner. When the image data produced by the personal computer or transferred from the image scanner is to be printed, the connection cable is disconnected from the image scanner and connected to the communication connector of a printer so that the personal computer and the printer can be connected. As such, the personal computers having a single Centronics connector is not convenient because cable connection needs to be switched when the personal computer receives image data from the image scanner and when the personal computer sends the image data to the printer for printing. Switching the cable connection is troublesome and time consuming, and data transfer is not accomplished straightforwardly.

There are such personal computers that are provided with two Centronics connectors, one for connection to an image scanner and the other for connection to a printer. With such personal computers, receipt of image data from the image scanner and printing the image data with the printer can be performed in a streamlined manner without need for changing connection of the cable from one to the other. However, provision of two Centronics connectors increases the cost of personal computer. Further, when the image on an information sheet is to be copied, the data containing the image is not straightly transferred to the printer from the image scanner but transferred to the printer via the personal computer. Therefore, data transfer complexity problem still remains unsolved.

Japanese Laid-Open Patent Publication (Kokai) No. Hei-1-256860 discloses a scanner printer provided with two communication connectors capable of receiving parallel data from two external devices. One communication connector of the scanner printer is connected to the Centronics connector of the personal computer, and the other communication connector thereof to the communication connector of an image scanner. With such a system, a large capacity memory device does not need to be provided in the personal computer for storing the image data transferred from the image scanner, and printing the image data can be performed at a high speed because the image data obtained from the image scanner is directly transferred to the scanner printer, not via the personal computer. Although the above-described scanner printer is capable of making a copy of an original document through a straightforward data transfer, the image data obtained in the image scanner cannot be retained in the personal computer for a future use.

SUMMARY OF THE INVENTION

In view of the foregoing, it is an object of the present invention to facilitate transfer of image data among an image capturing device, a host computer, and a printer.

To achieve the above and other object, an image capturing device in accordance with the present invention includes reading means, control means, a first connector, a second connector, and data transfer control means. The reading means reads images on an original document and produces data representative of the images on the original document. The control means is provided for controlling the reading means and performing data processing of the data produced from the reading means. The control means outputs image data corresponding to the data produced from the reading means. The first connector is connected through a first connection cable to a host computer and has at least one data terminal and at least one control terminal. The second connector is connected through a second connection cable to a printer, and also has at least one data terminal and at least one control terminal. The data transfer control means is selectively set to one of a first transfer mode, a second transfer mode, and a third transfer mode. In the first transfer mode, an image data sent from the host computer through the first connector is sent to the printer through the second connector. In the second transfer mode, the image data produced from the reading means is sent to the host computer through the first connector. In the third transfer mode, the image data produced from the reading means is sent to the printer through the second connector.

The data transfer control means includes a first data line, a second data line, a third data line, and data line change-over means. The first data line connects the data terminal on the first connector to the data terminal on the second connector. The second data line connects the control means to the data terminal on the first connector. The third data line connects the control means to the data terminal on the second connector. The data line change-over means is provided for selectively enabling one of the first data line, the second data line, and the third data line and disabling remaining two data lines. The first data line is enabled when the data transfer control means is in the first transfer mode, the second data line is enabled when the data transfer control means is in the second transfer mode, and the third data line is enabled when the data transfer control means is in the third transfer mode.

The data transfer control means further includes a first control signal line, a second control signal line, a third control signal line, and control signal line change-over means. The first control signal line connects the control terminal on the first connector to the control terminal on the second connector. The second control signal line connects the control terminal on the first connector to the control means. The third control signal line connects the control terminal on the second connector to the control means. The control signal line change-over means is provided for selectively enabling one of the first control signal line, the second control signal line, and the third control signal line and disabling remaining two control signal lines. The first control signal line is enabled when the data transfer control means is in the first transfer mode, the second control line is enabled when the data transfer control means is in the second transfer mode, and the third control line is enabled when the data transfer control means is in the third transfer mode.

Preferably, the control means outputs multi-bit image data in parallel mode. The first connector has a plurality of data terminals for transmitting and receiving the multi-bit image data in parallel mode. Also, the second connector has a plurality of data terminals for receiving the multi-bit image data in parallel mode separately from the host computer and the control means.

The host computer has a connector connected to the first connector, and the printer has a connector connected to the second connector. The first connector and the connector of the printer are identically configured, and the second connector and the connector of the host computer are also identically configured.

According to another aspect of the present invention, there is provided an image data transfer system that includes an image capturing device, a host computer, and a printer. The image capturing device has reading means for reading images on an original document and producing first image data. The host computer is connected through a first connection cable to the image capturing device, and outputs second image data to the image capturing device. The printer is connected through a second connection cable to the image capturing device. The image capturing device includes a first connector, a second connector, and data transfer control means. The first connector is connected through the first connection cable to the host computer, and the second connector is connected through the second connection cable to the printer. The data transfer control means is selectively set to one of a first transfer mode, a second transfer mode, and a third transfer mode. In the first transfer mode, the second image data sent from the host computer through the first connector is sent to the printer through the second connector. In the second transfer mode, the image data produced from the reading means is sent to the host computer through the first connector. In the third transfer mode, the image data produced from the reading means is sent to the printer through the second connector.

In the image data transfer system thus constructed, the data transfer control means selects the first transfer mode as a default setting. The data transfer control means forcibly switches the first transfer mode to the second transfer mode when a predetermined transfer mode change-over command data is received from the host computer. The image capturing device includes a copy switch, and when the copy switch is operated, the data transfer control means forcibly changes the first transfer mode to the third transfer mode and sends a busy signal to the host computer to thereby instruct the host computer to stop transmitting the second image data to the printer.

According to still another aspect of the present invention, there is provided a data transfer control circuit for use in combination with a host computer, a printer, and an image capturing device. The data transfer control circuit includes a first connector connected through a first connection cable to the host computer, a second connector connected through a second connection cable to the printer, and a third connector connected through a third connection cable to the image capturing device. There is provided mode setting means for selectively setting one of a first transfer mode, a second transfer mode, and a third transfer mode. Connection means is provided for connecting, in the first transfer mode, the host computer to the printer, in the second transfer mode, the image capturing device to the host computer, and in the third transfer mode, the image capturing device to the printer.

The mode setting means has a default setting function for setting the first transfer mode as a default setting. The host computer has means for outputting a transfer mode change command, and in response to the transfer mode change command, the mode setting means changes the default setting to the second transfer mode. Further, the mode setting means changes the second transfer mode to the first transfer mode when data communication between the image capturing device and the host computer is terminated. The image capturing device has switch means for producing a print command. In response to the transfer mode change command and the print command, the mode setting means changes the default setting to the third transfer mode. Further, the mode setting means changes the third transfer mode to the first transfer mode when data communication between the image capturing device and the printer is terminated.

BRIEF DESCRIPTION OF THE DRAWINGS

The particular features and advantages of the invention as well as other objects will become more apparent from the following description taken in connection with the accompanying drawings, in which.

DETAILED DESCRIPTION OF THE PREFERRED EMBODIMENTS

A preferred embodiment of the present invention will be described while referring to the accompanying drawings.

Figure 2:
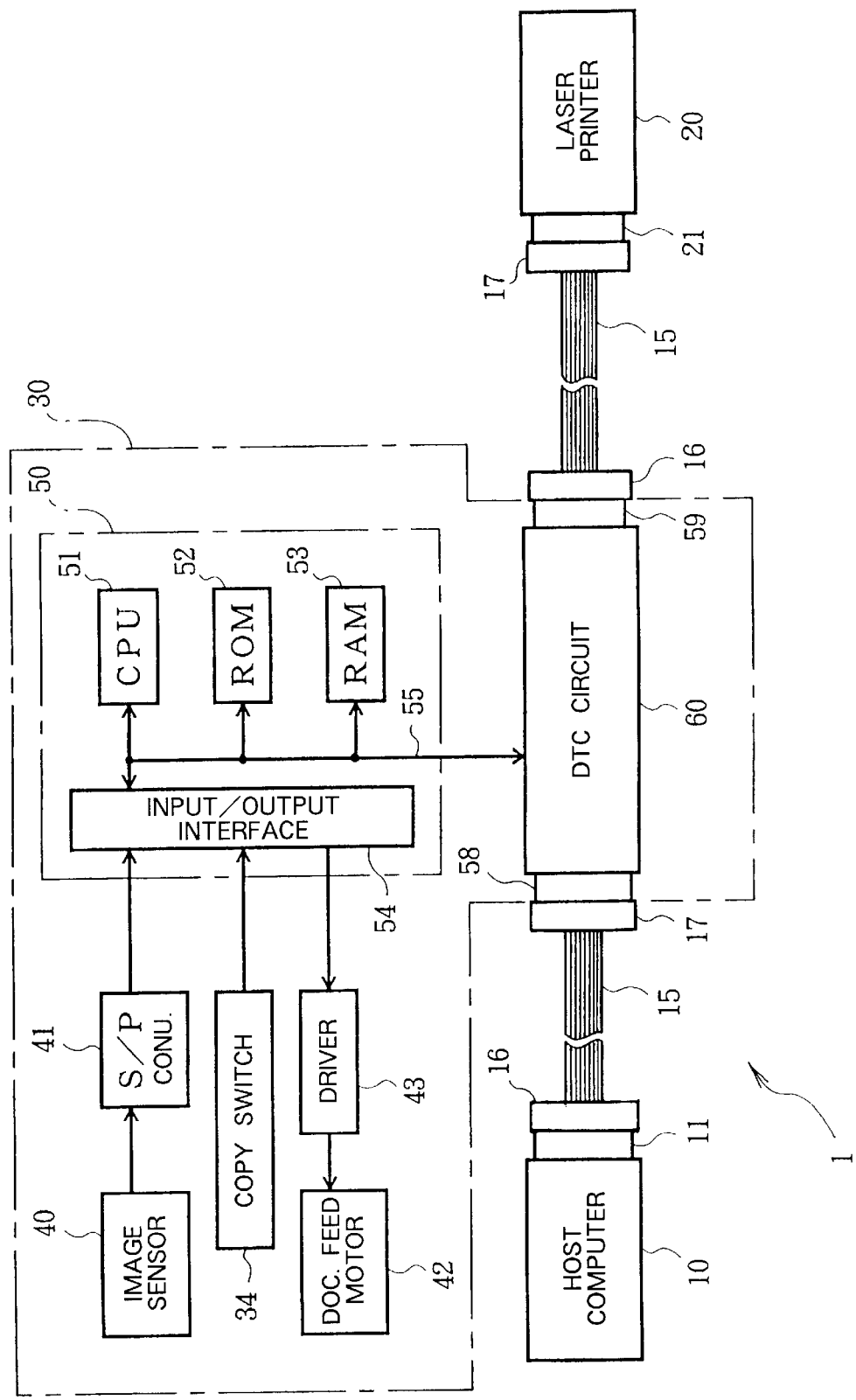
FIG. 2 is a block diagram of a control system of an image data transfer system according to the embodiment of the present invention.

The present invention is embodied to an image data transfer system wherein as shown in FIG. 2, a host computer 10 and a laser printer 20 are connected to an image scanner 30 with a data transfer control (DTC) circuit 60. The image scanner 30 captures or reads an image on an information sheet or an original sheet document.

An ordinarily used personal computer is used for the host computer 10 and is capable of transmitting and receiving image data in parallel transfer mode according to an IEEE1284 communication interface standard. The host computer 10 is provided with a 25-pin Centronics connector 11 and a Centronics communication port.

The laser printer 20 includes a laser scan printing mechanism for printing an image. The laser printer 20 is provided with a 36-pin Centronics connector 21 for receiving image data in parallel form.

Figure 1:
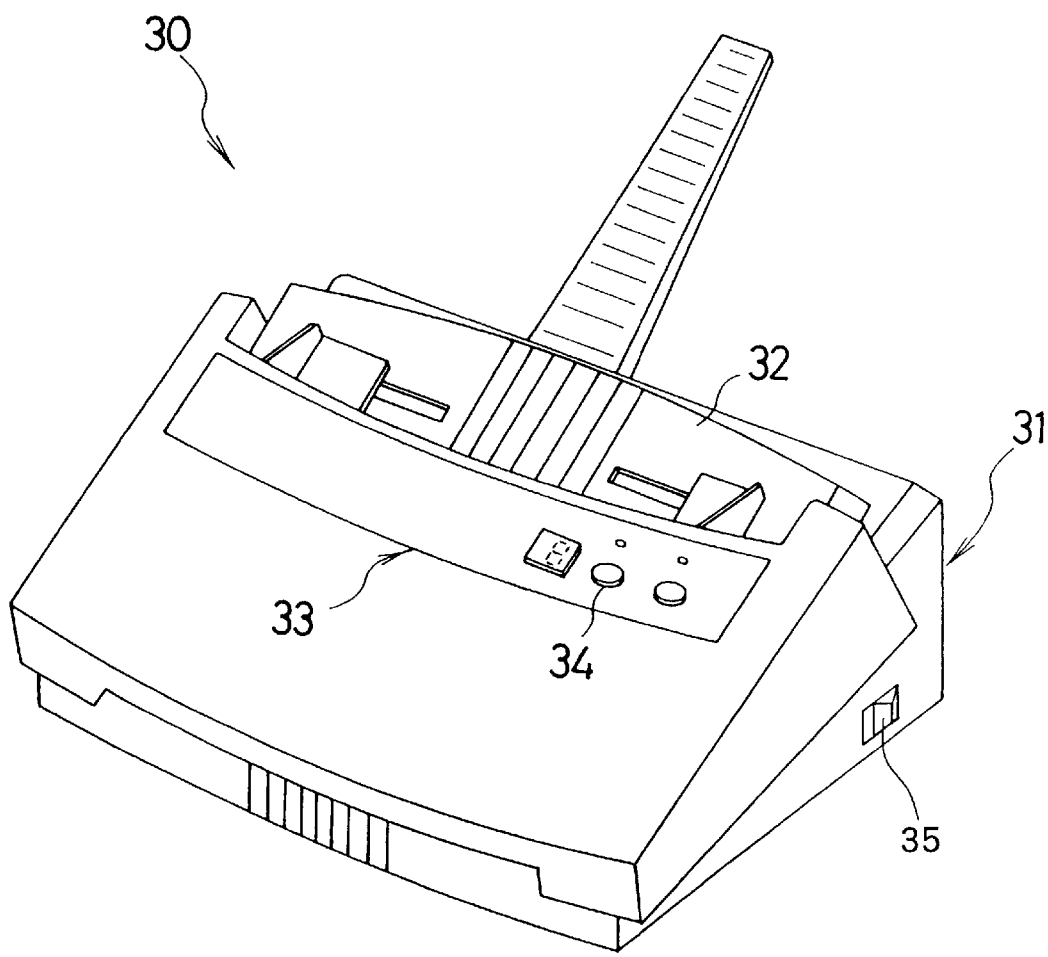
FIG. 1 is a perspective view showing an image scanner according to an embodiment of the present invention.

As shown in FIG. 1, the image scanner 30 includes a paper holder 32 for supporting a stack of information sheets or original documents to be copied. A document transporting mechanism (not shown) is housed in a frame 31. The lowermost document stacked in the paper holder 32 is fed inside the image scanner 30, transported along a predetermined document transportation path, and then discharged out of the image scanner 30. An image sensor 40 (see FIG. 2) is disposed in the document transportation path for reading an image on the original document. The image sensor 40 is made up of a plurality of CCDs (charge coupled devices) aligned in a direction traversing the document transportation path.

A power switch 35 is provided in the side frame and an operation panel 33 is provided in the upper frame. Operation switches including a copy switch 34 are provided in the operation panel 33.

The image scanner 30 incorporates a control system as shown in block form in FIG. 2. A control unit 50 includes a CPU (central processing unit) 51, an input/output interface 54 connected via bus 55 to the CPU 51, a ROM (read-only memory) 52, and a RAM (random access memory) 53. To the input/output interface 54 are connected an S/P (serial-to-parallel) converter 41, the copy switch 34, a driver 43, a light source (not shown) for illuminating the original document, a cover open detection switch (not shown) and the like. The S/P converter 41 receives serial image data from the image sensor 40 and converts the serial image data to parallel image data. The driver 43 drives a document feed motor 42 which is a drive source of the document transportation mechanism.

The DTC circuit 60 is connected to the control unit 50 via the bus 55. The DTC circuit 60 is provided with a 36-pin, Amphenol type first connector 58 capable of transferring parallel image data and control signals, and a 25-pin, DSUB type second connector 59 which is also capable of transferring parallel image data and control signals. The first connector 58 is the same in configuration as the connector 21 provided in the laser printer 20, and the second connector 59 is the same in configuration as the connector 11 provided in the host computer 10. The host computer 10 and the image scanner 30 are connected with a connection cable 15 having at one end a 25-pin, DSUB connector 16 and at the other end a 36-pin, Amphenol type connector 17. With the same connection cable 15, the laser printer 20 and the image scanner 30 are connected.

The ROM 52 of the control unit 50 stores a print drive control program for driving the printing mechanism, a transfer control program for implementing parallel transfer of the image data according to an IEEE1284 communication interface standard, and a control program for an image data transfer mode change-over control. The RAM 53 includes a reception buffer, line buffer, and various memories used when image data is printed or transferred.

Figure 3:
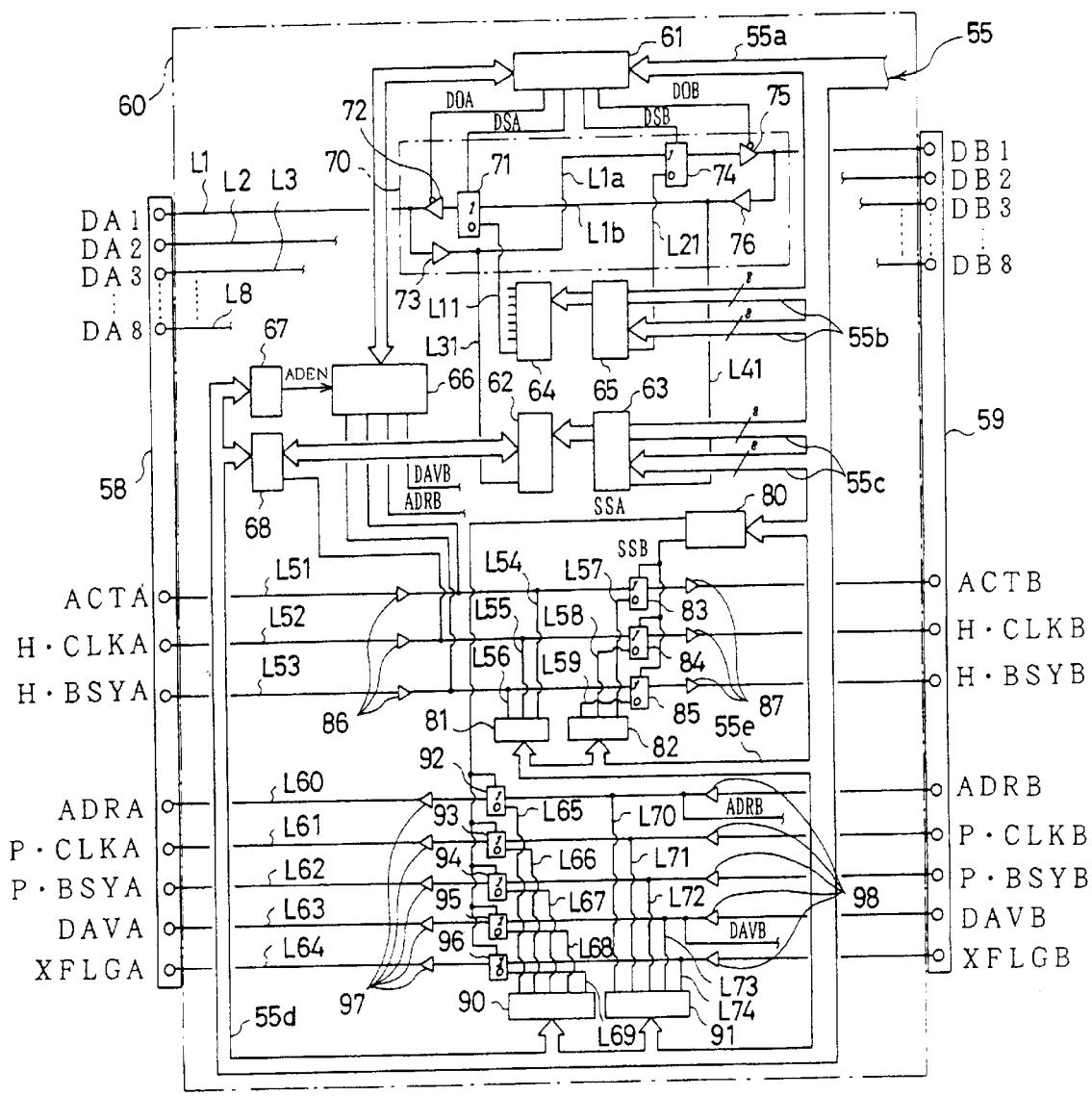
FIG. 3 is a circuit diagram of a data transfer control circuit.
Figure 4:
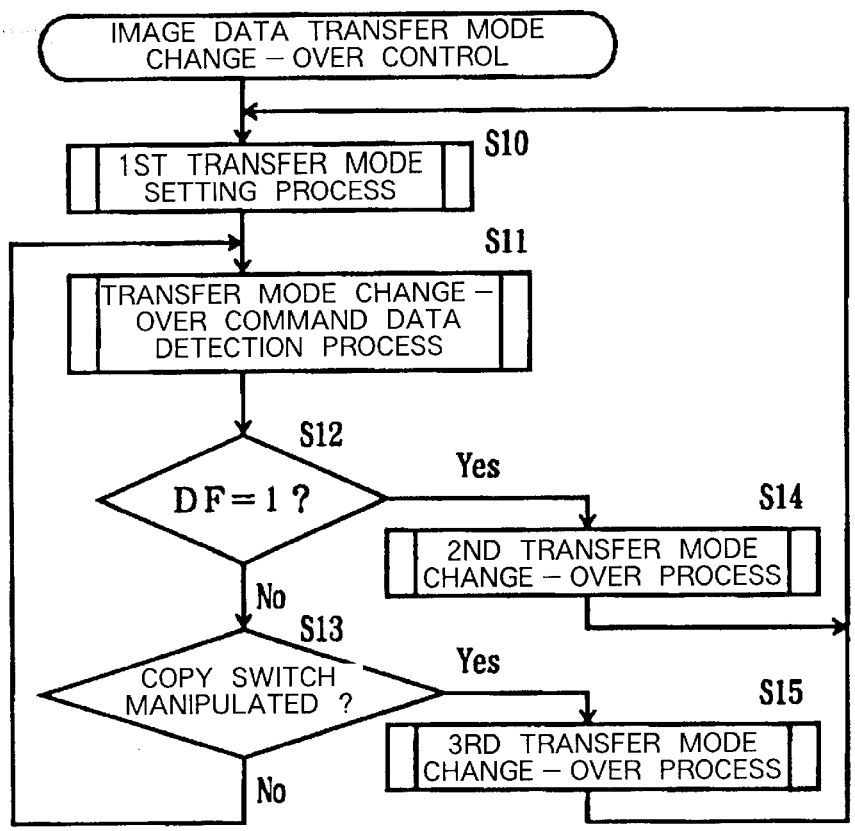
FIG. 4 is a flowchart illustrating a routine of an image data transfer mode change-over control.
Figure 5:
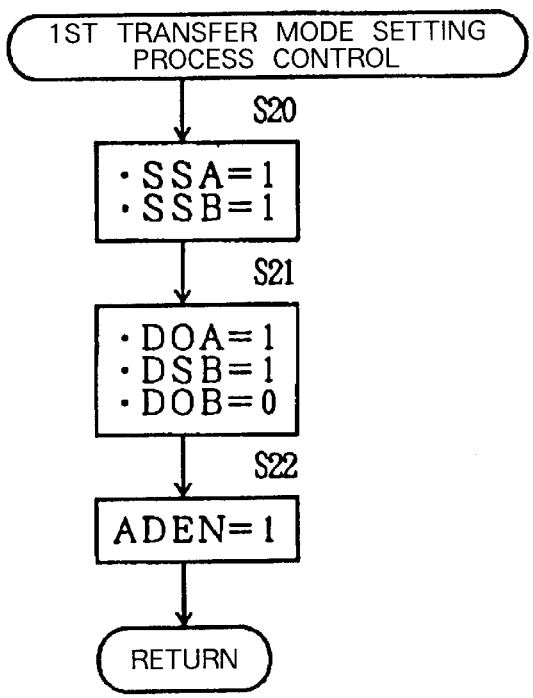
FIG. 5 is a flowchart illustrating a routine of a first transfer mode setting process control.
Figure 6:
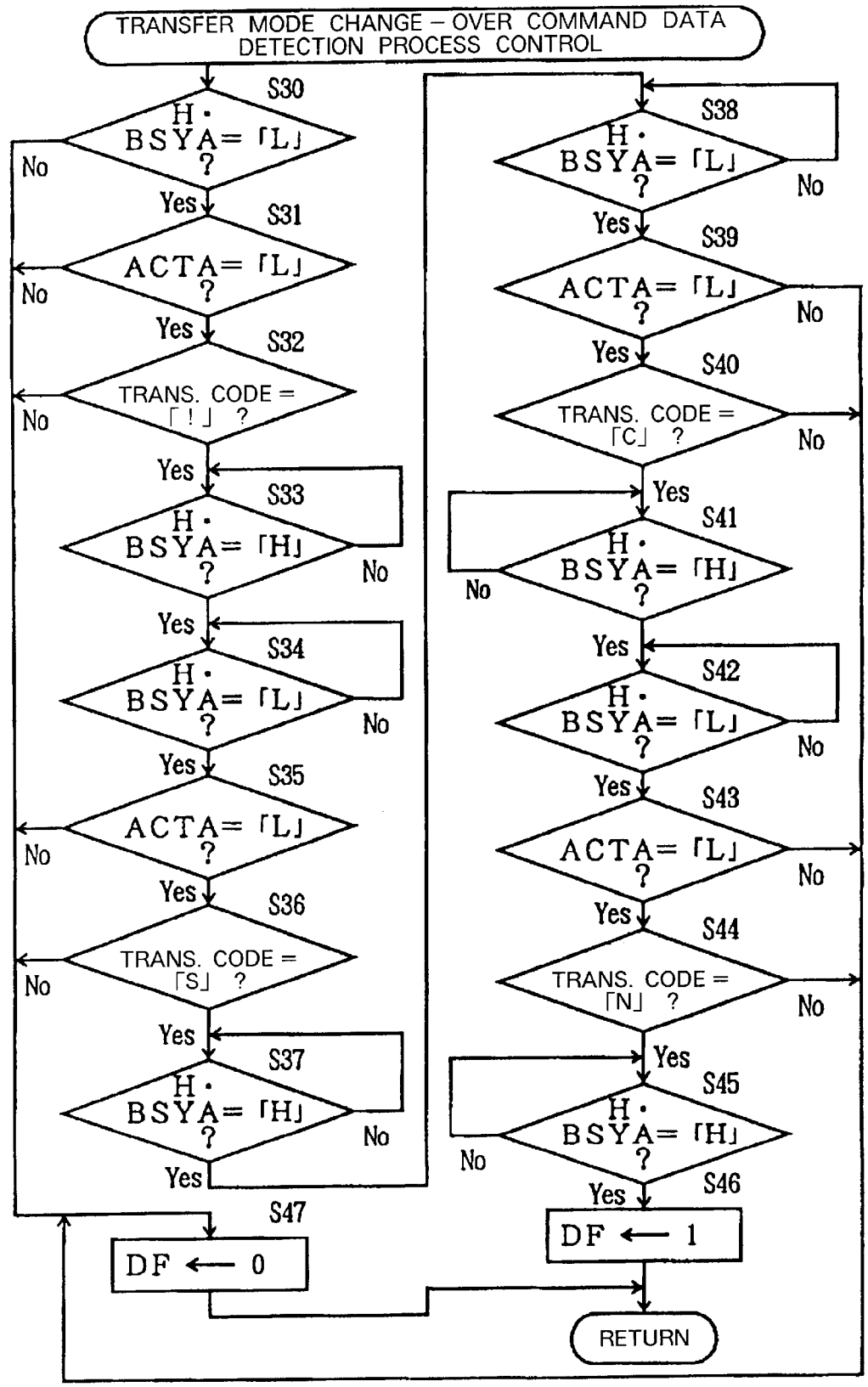
FIG. 6 is a flowchart illustrating a routine of a transfer mode change-over command data detection process control.
Figure 7:
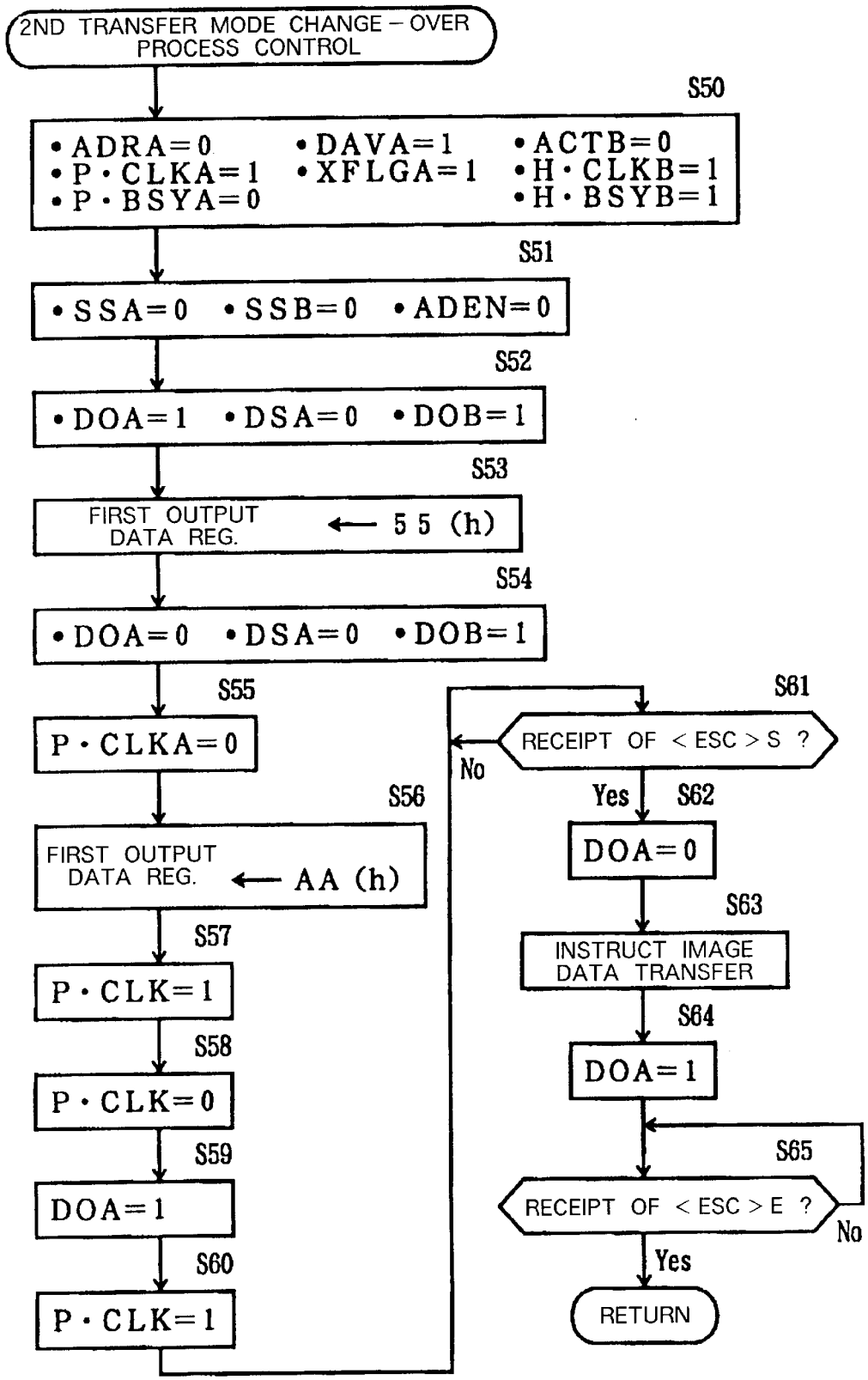
FIG. 7 is a flowchart illustrating a routine of a second transfer mode setting process control.
Figure 8:
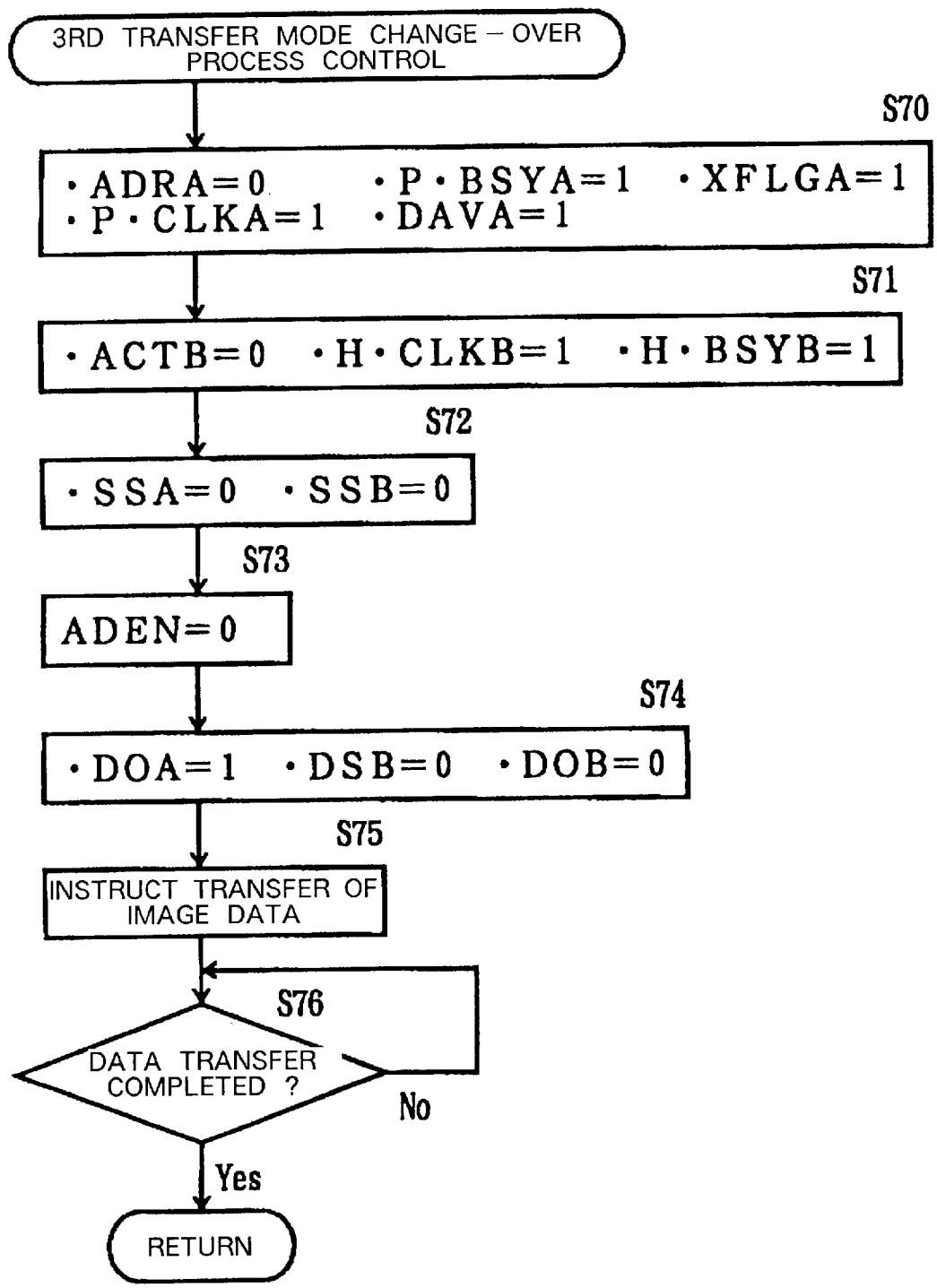
FIG. 8 is a flowchart illustrating a routine of a third transfer mode setting process control.

FIG. 3 shows a circuit configuration of the DTC circuit 60. The DTC circuit 60 has a first connector 58 and a second connector 59. The first connector 58 has eight data terminals DA1 to DA8 and the second connector 59 has corresponding eight data terminals DB1 to DB8 for allowing 8-bit parallel data transfer. The data terminals DA1 to DA8 are connected to data terminals DB1 to DB8 via data lines L1 to L8, respectively.

Each of the data lines L1 to L8 includes a data line change-over circuit 70 for enabling selected one of three groups of data lines consisting of L1 to L8, L11 to L18, and L21 to L28 according to a selected transfer mode. There are three transfer modes. The first transfer mode is for transferring data from the host computer 10 to the laser printer 17 or vice versa. The second transfer mode is for transferring data from the image scanner 30 to the host computer 10. The third transfer mode is for transferring data from the image scanner 30 to the laser printer 20. The data line change-over circuits for the data lines L1 to L8 are identically configured, and only the data line change-over circuit 70 for the data line L1 is shown in FIG. 3.

The data line L1 is provided for bi-directionally transferring data between the host computer 10 and the laser printer 20 and hence has a first directional line L1a for transferring data from the first connector 58 to the second connector 59, and a second directional line L1b for transferring data from the second connector 59 to the first connector 58. The first directional line L1a includes an output buffer gate 73, a selector 74, and an output buffer gate 75 having an output permission terminal. Similarly, the second directional line L1b includes an output buffer gate 76, a selector 71, and an output buffer gate 72 having an output permission terminal.

The two output buffer gates 72 and 75 and two selectors 71 and 74 operate in response to change-over signals received from a transfer direction change-over register 61. The transfer direction change-over register 61 receives change-over signals from the CPU 51 of the image scanner 30 via control bus 55a and also from a transfer direction controller 66 constructed with a gate array. Specifically, when an "H" level selection signal DSB is supplied to the selector 75 and an "L" level output permission signal DOB is supplied to the output buffer gate 75 from the transfer direction change-over register 61, the terminal "1" of the selector 74 is selected and the output buffer gate 75 is rendered conductive, thereby enabling the first directional line L1a, that is, bringing the first directional line L1a to be in a connecting condition. When the "H" level selection signal DSA is supplied to the selector 71 and the "L" level output permission signal DOA is supplied to the output buffer gate 72, the terminal "1" of the selector 71 is selected and the output buffer gate 2 is rendered conductive, thereby enabling the second directional line L1b.

The terminal "0" of the selector 71 and a first output data register 64 are connected together with a data line L11. Likewise, the terminal "0" of the selector 74 and a second output data register 65 are connected together with a data line L21. These first and second output data registers 64 and 65 are connected to the CPU 51 of the image scanner 30 via 8-bit data bus 55b. When the DTC circuit 60 is in the second transfer mode for transferring data from the image scanner 30 to the host computer 10, the "L" level selection signal DSA is applied to the selector 71 to select the terminal "0"

and the "L" level output permission signal DOA is applied to the output buffer gate 72. As a result, the data line L11 is enabled and the image data from the image scanner 30 is transferred to the host computer 10 via the data bus 55b, the first output register 64, the selector 71, and the buffer gate 72. When the DTC circuit 60 is in the third transfer mode for transferring data from the image scanner 30 to the laser printer 20, the "L" level selection signal DSB is applied to the selector 74 to select the terminal "0" and the "L" level output permission signal DOB is applied to the output buffer gate 75. As a result, the data line L21 is enabled and the image data from the image scanner 30 is transferred to the laser printer 20 via the data bus 55b, the second output register 65, the selector 74, and the buffer gate 75.

The first directional line L1a and a first input data register 62 are connected with a data line L31 so that data from the host computer 10 can be received at the DTC circuit 60 at all times. Likewise, the second directional line L1b and a second input data register 63 are connected with a data line L41 so that the data from the laser printer 20 can be received at the DTC circuit 60 at all times. The first and second input data register 62 and 63 are connected to the CPU 51 of the image scanner 30 via 8-bit data bus 55c.

The transfer direction controller 66 receives an automatic change-over signal ADEN from a transfer direction automatic change-over register 67. When the automatic change-over signal ADEN is at "H" level, the transfer direction controller 66 controls the transfer direction change-over register 61 depending on an active signal ACTA and a host busy signal H.BSYA from the host computer 10 or on a data request signal ADRB and a data avail signal DAVB from the laser printer 20. A data latch 68 is connected to the first input data register 62 and the control bus 55d. The data latch 68 retrieves command data sent from the host computer 10 and set in the first input data register 62, and transfers the retrieved command data as a control signal to the control bus 55d.

Second, transfer of control signals will be described. The host computer 10 transmits to peripheral components three control signals consisting of active signal ACTA, host clock signal H.CLKA and host busy signal H.BSYA. The active signal ACTA activates the IEEE-1284 interface and instructs the data transfer direction on the data bus. The host clock signal H.CLKA instructs transfer timing of command data. The host busy signal H.BSYA instructs timing of data transfer. The first connector 58 has three control signal terminals to which the above-described three control signals are respectively applied. Also, the second connector 59 has corresponding three control signal terminals. The respective ones of the control signal terminals in the first and second connectors 58 and 59 are connected individually with control signal lines L51 to L53. To each of the control signal lines L51 to L53 are connected output buffer gate 86, another output buffer gate 87, and corresponding one of selectors 83 to 85 as shown. When the DTC circuit 60 is in the first transfer mode, those selectors 83 to 85 select their terminal "1" in response to a "H" level change-over signal SSB fed from a change-over control register 80, thereby enabling those three control signal lines L51 to L53.

A first input status register 81 receives the active signal ACTA, host clock signal H.CLKA, and host busy signal H.BSYA from the control signal lines L54 to L56 connected, respectively, to the control signal lines L51 to L53, and transfers those signals to the control bus 55e. A second output status register 82 transfers, when the DTC circuit 60 is in the third transfer mode, the active signal ACTA, host clock signal H.CLKA, and host busy signal H.BSYA which are received through the control bus 55e, to the "0" terminals of selectors 83 to 85 through control signal lines L57 to L59, respectively.

Each peripheral component transmits to the host computer 10 five control signals consisting of data request signal ADRB, printer clock signal P.CLKB, printer busy signal P.BSYB, data avail signal DAVB, and X flag signal XFLGB. The laser printer 20, which is one of the peripheral components of the host computer 10, transmits those five control signals to the host computer 10. The printer clock signal P.CLKB instructs timing of data transfer, the printer busy signal P.BSYB instructs that the peripheral component is in a busy status, and the data avail signal DAVB instructs that there exists data to be transferred.

The second connector 58 has five control signal terminals to which the above-described five control signals are respectively applied. Also, the first connector 58 has corresponding five control signal terminals. The respective ones of the control signal terminals in the first and second connectors 58 and 59 are connected individually with control signal lines L60 to L64. To each of the control signal lines L60 to L64 are connected output buffer gate 98, another output buffer gate 97, and corresponding one of selectors 92 to 96 as shown. When the DTC circuit 60 is in the first transfer mode, those selectors 92 to 96 select their terminal "1" in response to a "H" level change-over signal SSA fed from the change-over control register 80, thereby enabling those five control signal lines L60 to L64.

A first output status register 90 transfers, when the DTC circuit 60 is in the second transfer mode, the above-mentioned five control signals which are received through the control bus 55d, to the "0" terminals of selectors 92 to 96 through control signal lines L65 to L69, respectively. A second input register 91 receives the above-mentioned five control signals from control signal lines L70 to L74 connected, respectively, to the control signal lines L60 to L64, and transfers those signals to the control bus 55d.

Figure 9:
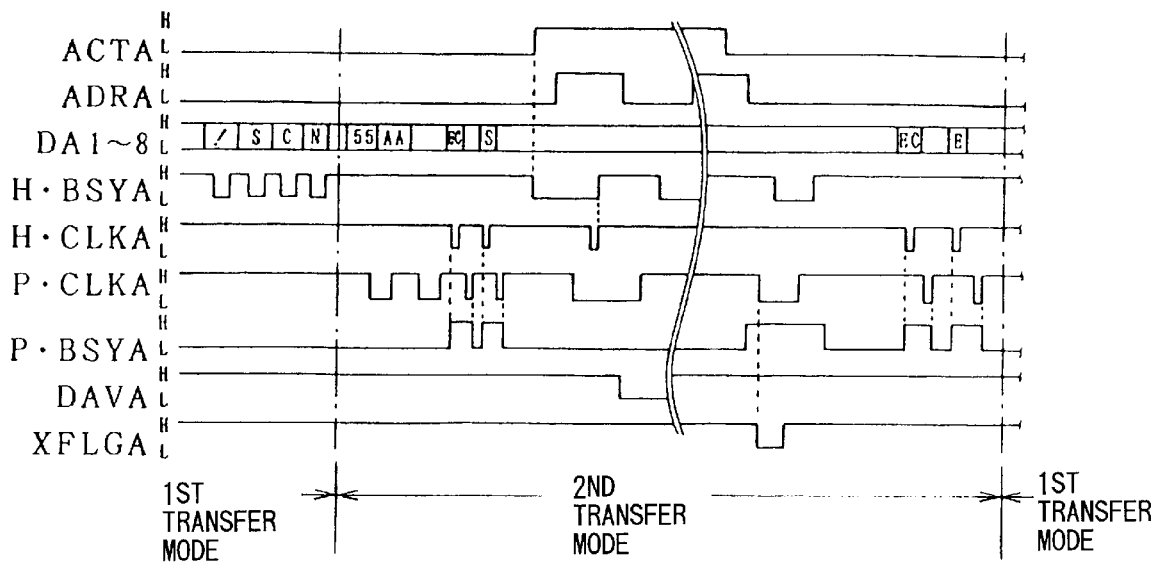
FIG. 9(a) is a time chart of various signals on a first connector when a first transfer mode is changed-over to a second transfer mode.
FIG. 9(b) is a time chart of various signals on a second connector when the first transfer mode is changed-over to the second transfer mode.
Figure 9:
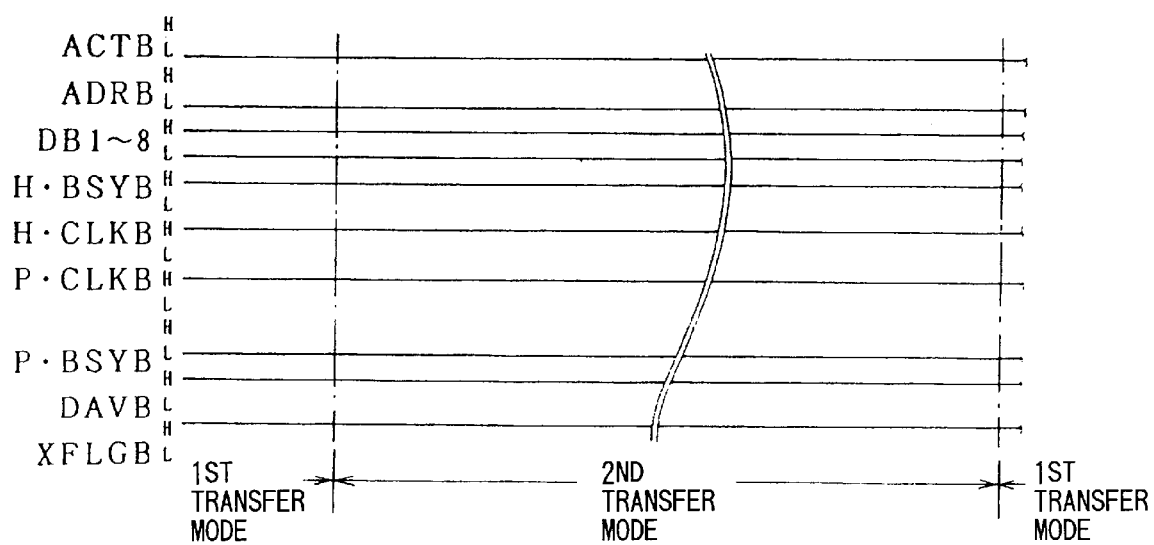
Figure 10:
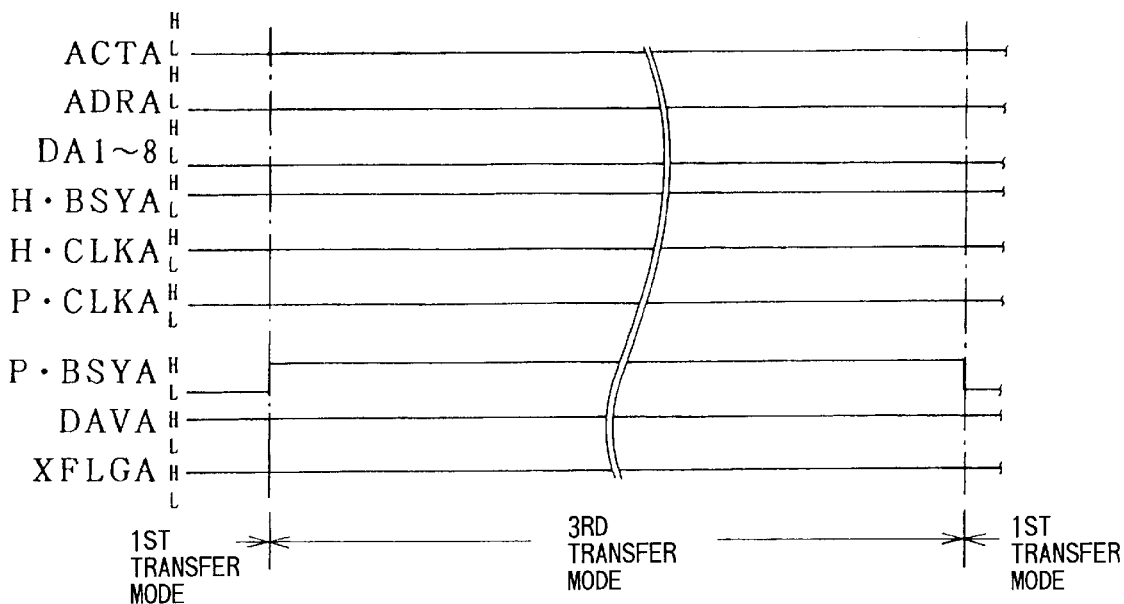
FIG. 10(a) is a time chart of various signals on the first connector when the first transfer mode is changed-over to a third transfer mode.
FIG. 10(b) is a time chart of various signals on the second connector when the first transfer mode is changed-over to the third transfer mode.
Figure 10:
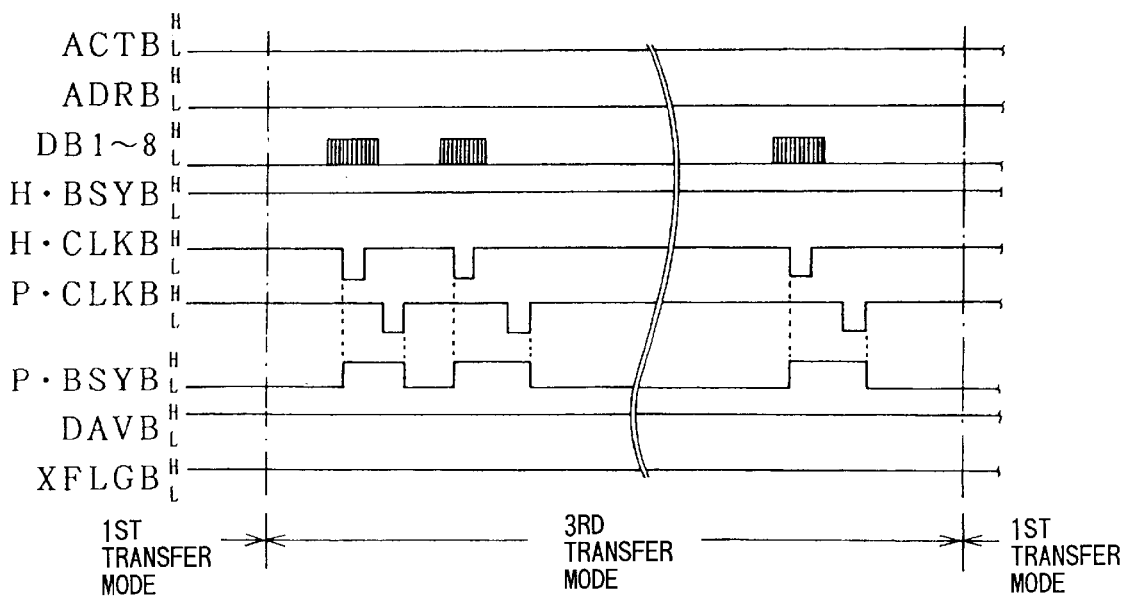

Next, referring to the flowcharts of FIGS. 4 through 8 and time charts shown in FIGS. 9 and 10, description will be made with respect to an image data transfer mode change-over control routine for selectively changing over the DTC circuit 60 to either one of the first, second, and third transfer modes. This routine is implemented under the aegis of the control unit 50 of the image scanner 30. In the following description, Si indicates the step number wherein i is an integer more than 10.

Powering the image scanner 30 by the manipulation of the power switch 35 starts the image data transfer mode change-over control routine. First, to place the DTC circuit 60 in a default condition, the first transfer mode setting process (see FIG. 5) is implemented for setting the DTC circuit 60 in the first transfer mode (S10). When this control is started, the change-over control register 80 outputs two "H" level change-over signals SSA and SSB (S20). In response to the "H" level change-over signal SSB, three selectors 83 to 85 select the "1" terminals at the same time, so that three control signal lines L51 to L53 are enabled, thereby connecting the corresponding three terminals of the first and second connectors 58 and 59. Further, because five selectors 92 to 96 select the "1" terminals at the same time in response to the "H" level change-over signal SSA, the corresponding five control signal lines L60 to L64 are enabled, thereby connecting the corresponding five terminals of the first and second connectors 58 and 59.

Next, the transfer direction change-over register 61 outputs the "H" level output permission signal DOA, the "H"

level selection signal DSB, and the "L" level output permission signal DOB (S21), causing to enable the first directional line L1a of the data line L1 and to disable the second directional line L1b of the data line L1. Control data is applied to the transfer direction automatic change-over register 67 which in turn outputs the "H" level automatic change-over signal ADEN to the transfer direction controller 66. Then, by the control of the transfer direction controller 66, the data line change-over operation in the circuit 70 is automatically carried out (S22), whereupon the first transfer mode setting process is terminated and the routine returns to S11 of the image data transfer mode change-over control routine. With the above-described processing, the first transfer mode is set wherein the image data from the host computer 10 is directly transferred to the laser printer 20 via the data lines L1 to L8 and the various control signals from the host computer 10 are directly transferred to the laser printer 20 via the control signal lines L51 to L53.

Under the condition in which the first transfer mode has been set, a command data detection process (see FIG. 6) is executed (S11) to detect whether or not the transfer mode change-over command is received from the host computer 10. The host busy signal H.BSYA is rendered to "L" level whenever one byte data is sent from the host computer 10. In the command data detection process, the change-over command detection flag DF is reset when the host busy signal H.BSYA is at the "H" level at which no data is sent from the host computer 10 (S30: No), whereupon the command data detection process is terminated and the routine returns to S12 of the image data transfer mode change-over control.

However, as shown in FIG. 9(a), when the transmission code "!" is retrieved (S32: Yes) from the first input data register 62 under the condition in which the host busy signal H.BSYA is at the "L" level (S30: Yes) and the active signal ACTA is at the "L" level (S31: Yes), and when the transmission codes "S", "C", and "N" are successively retrieved from the first input data register 62 (S36, S40, S44) after the host busy signal H.BSYA turns to the "H" level immediately after the previous transmission code is retrieved and thereafter the conditions in which the host busy signal H.BSYA is at the "L" level and the active signal ACTA is at the "L" level are met (S33 to S35, S37 to S39, and S41 to S43), the change-over command detection flag DF is set (S46) and then the routine returns to S12 of the transfer mode change-over control. When either one of S31–S32, S35–S36, S39–S40, and S43–S44 is determined to be "No", the change-over command detection flag DF is reset (S47).

In the transfer mode change-over control, when the change-over command detection flag DF is not set, that is, when the change-over command is not detected (S12: No), and when the copy switch 34 is not manipulated (S13: No), S11 to S13 are repeatedly carried out while maintaining the first transfer mode. When the change-over command is detected (S12: Yes) as a result of execution of the transfer mode change-over command data detection process, the second transfer mode change-over process (see FIG. 7) will be executed (S14).

When the second transfer mode change-over process is executed, as shown in FIGS. 9(a) and 9(b), the data request signal ADRA is rendered to the "L" level, the printer clock signal P.CLKA to the "H" level, the printer busy signal P.BSYA to the "L" level, the data avail signal DAVA to the "H" level, and the X flag signal XFKGA to the "H" level. In addition, the active signal ACTB is rendered to the "L" level, the host clock signal H.CLKB to the "H" level and the host busy signal to the "H" level (S50).

The change-over control register 80 outputs "L" level change-over signals SSA and SSB to selectors 92 to 96 and to selectors 83 to 85, respectively (S51). In response thereto, the three selectors 83 to 85 select the "0" terminal at the same time, causing to enable the control signal lines L57 to L59, and the five selectors 92 to 96 select the terminal "0" at the same time, causing to enable the control signal lines L65 to L69. Further, the transfer direction automatic change-over register 67 outputs the "L" level automatic change-over signal ADEN to the transfer direction controller 66 (S51). Therefore, the data line change-over circuit 70 does not perform automatic change-over operation between the first directional line L1a and the second directional line L1b with respect to the data line L1. The same is true with respect to the remaining data lines L2 to L8.

The "H" level output permission signal DOA, the "L" level selection signal DSA, and the "H" level output permission signal DOB are output (S52) from the transfer direction change-over register 61. In response to the "0" level selection signal DSA, the terminal "0" of the selector 71 is selected, thereby allowing the first output data register 64 to output data to the selector 71. In order to confirm that the bi-directional data transfer can be achieved between the host computer 10 and the image scanner 30, data "55(h)" is loaded in the first output data register 64 (S53). Next, the "L" level output permission signal DOA, the "L" level selection signal DSA, and the "H" level output permission signal DOB are output to enable the data line L11 (S54). Then, the printer clock signal P.CLKA is rendered to the "L" level (S55), and the data "55(H)" loaded in the first output register 64 is sent to the host computer 10 via the selector 71 and the output buffer gate 72 and the first connector 58.

The data "AA(h)" is loaded in the first output data register 64 (S56). The printer clock signal P.CLKA is changed to the "H" level (S57), and the data "AA(h)" is transferred to the host computer 10. Thereafter, the printer clock signal P.CLKA is again changed to the "L" level (S58). Next, the output permission signal DOA is changed to the "H" level (S59) to thereby enable the first directional line L1a of the data line L1. Then, the printer clock signal P.CLKA is changed to the "H" level (S60).

Based on the data in the data latch 68 which reads the data stored in the first input data register 62 storing the data sent from the host computer 10, it is determined whether or not a transfer start instruction data "<ESC>S" has been received (S61) from the host computer 10. The transfer start instruction data contains an escape code <ESC>. Upon receipt of the transfer start instruction data "<ESC>S" (S61: Yes), the "L" level output permission signal DOA is output to the output buffer gate 72 to thereby enable the data line L11 (S62). Thereafter, transfer of the image data from the image scanner 30 to the host computer 10 is instructed (S63). When the transmission of the image data is ended, the "H" level output permission signal DOA is output to the output buffer gate 72 (S64) so that data from the host computer 10 can be received at the first input data register 62. In this condition, it is determined whether or not a transfer end instruction data "<ESC>E" is received from the host computer 10 (S65).

More specifically, as shown in FIG. 9(a), at the start of image data transfer from the image scanner 30 to the host computer 10, the "L" level output permission signal DOA is supplied to the output buffer gate 72 after the active signal ACTA is raised to the "H" level. The data line L11 is thus enabled, and the image data from the CPU 51 is output to the host computer 10 via the data line L11 and the first connector 58 and stored therein. When the transfer of the image data from the image scanner 30 to the host computer 10 is ended, the "H" level output permission signal DOA is output to the output buffer gate 72 following the active signal ACTA that falls to the "L" level. As a result, the first directional line L1a is enabled. When the transfer end instruction data "<ESC>E" is received from the host computer 10 (S65: Yes), this process is ended and the routine returns to S10 of the image data transfer mode change-over control, whereupon the mode is changed to the first transfer mode.

During the execution of the steps S11 to S13 in the transfer mode change-over control, when the copy switch 34 is manipulated (S13: Yes), the third transfer mode change-over process (see FIG. 8) is executed (S15).

When this process is executed, as shown in FIGS. 10(a) and 10(b), the data request signal ADRA is rendered to the "L" level, the printer clock signal P.CLKA to the "H" level, the printer busy signal P.BSYA to the "H" level, the data avail signal DAVA to the "H" level, and the X flag signal XFLGA to the "H" level (S70). In addition, the active signal ACTB is rendered to the "L" level, the host clock signal H.CLKB to the "H" level, and the host busy signal H.BSYB to the "H" level (S71).

The change-over control register 80 outputs "L" level change-over signals SSA and SSB (S72). The transfer direction automatic change-over register 67 outputs the "L" level automatic change-over signal ADEN to the transfer direction controller 66 (S73). As a result, the three selectors 83 to 85 select the "0" terminal at the same time, causing to enable the corresponding control signal lines L57 to L59. Further, the five selectors 92 to 96 select the "0" terminal at the same time, causing to enable the corresponding control signal lines L60 to L64. The data line change-over circuit 70 does not perform automatic change-over operation. As shown in FIG. 10(a), the "H" level printer busy signal P.BSYA is transmitted via the control signal line L62 to the host computer 10 and instructs the host computer 10 to stop transmission of the image data.

Further, the "H" level output permission signal DOA, the "L" level selection signal DSB, and the "L" level output permission signal DOB are output (S74). As a result, the terminal "0" of the selector 74 is selected and the data line L21 is enabled. The image data stored in the second output data register 65 can be output to the laser printer 20. Next, transfer of image data to the laser printer 20 is instructed (S75). It is determined whether or not the transfer of the image data is complete (S76). When affirmative (S76: Yes), the printer busy signal P.BSYA is rendered to the "L" level, whereupon this process is ended and the routine returns to S10 where the mode is changed to the first transfer mode.

Next, operation of the transfer mode change-over control will be described. The following description will deal with one bit worth of the image data to be transferred to the host computer 10 via the first connector 58 or to the laser printer 20 via the second connector 59, although, in actuality, 8-bit image data is transferred in parallel mode.

When the image scanner 30 is powered, in each of the eight data line change-over circuits 70 provided corresponding to eight data lines L1 to L8 for 8-bit data transmission, the "1" terminal of the selector 74 is selected and the "H" level output permission signal DOB is output to the output buffer gate 75, thereby enabling the first directional line L1a of the data line L1. On the other hand, two "H" level change-over signals SSA and SSB are output from the change-over control register 80 to the selectors 92 to 96 and to selectors 83 to 85, respectively. As a result, three selectors L51 to L53 select their "1" terminals at the same time, so that the three control signal lines L51 to L53 are enabled.

Further, the five selectors 92 to 96 select their "1" terminals at the same time, so that the five control signal lines L60 to L64 are enabled. With such connections, the image data from the host computer 10 is directly transferred via data lines L1 to L8 to the laser printer 20, and the various control signals from the host computer 10 are directly transferred to the laser printer 20 via the control signal lines L51 to L53.

When the transfer mode change-over command is transmitted from the host computer 10 under the first transfer mode, the first transfer mode is forcibly changed to the second transfer mode. More specifically, the "L" level selection signal DSA is output to the selector 71 and the "L" level output permission signal DOA is output to the output buffer gate 72, causing to enable the data line L11. Therefore, the image data from the CPU 51 is output to the host computer 10 via the data line L11 and the first connector 58.

When the copy switch 34 is manipulated in the first transfer mode, the first transfer mode is forcibly changed to the third transfer mode. Specifically, the "L" level selection signal DSB is output to the selector 74 and the "L" level output permission signal DOB is output to the output buffer gate 75, causing to enable the data line L21. Therefore, the image data from the CPU 21 is output to the laser printer 20 via the data line L21 and the second connector 59.

As described, there are provided in the data transfer control circuit 60 data lines L1 to L8 for individually connecting the respective ones of the data terminals DA1 to DA8 on the first connector 58 to the corresponding data terminals DB1 to DB8 on the second connector 59; data lines L11 to L18 for connecting the data terminals on the first connector 58 to the CPU 51; and data lines L21 to L28 for connecting the data terminals on the second connector 59 to the CPU 51. In the first transfer mode, the data lines L1 to L8 are connected, thereby allowing the image data from the host computer 10 to be directly transferred to the laser printer 20 via the first connector 58, data lines L1 to L8, and the second connector 59. In the second transfer mode, the data lines L11 to L18 are connected, thereby allowing the image data captured by the image sensor 40 to be transferred to the host computer 10 via the data lines L11 to L18 and the first connector 58. In the third transfer mode, the data lines L21 to L28 are connected, thereby allowing the image data captured by the image sensor 40 to be transferred to the laser printer 20 via the data lines L21 to L28 and the second connector 59.

Because the data transfer control circuit 60 is configured so as to be set to the first transfer mode as a default condition, printing of the image data produced from the host computer 10 can be quickly printed in the laser printer 20 without need for the change of the transfer mode. When the predetermined transfer mode change-over commands are received from the host computer 10 under the first transfer mode, the first transfer mode is forcibly changed to the second transfer mode. Therefore, the image data from the image scanner 30 can be easily transmitted to the host computer 10 only by outputting the transfer change-over command data from the host computer 10 to the image scanner 30. There is no need to disconnect the connection cable from the laser printer 20 and connect it to the image scanner 30 as is done in the conventional system. It should be noted that the transfer mode change-over command data are not printed by the laser printer 20.

Furthermore, there are provided in the DTC circuit 60 control signal lines L51 to L53 and L60 to L64 for connecting the control signal terminals on the first connector 58 to the corresponding control signal terminals on the second connector 59 in one-to-one correspondence; control signal lines L65 to L69 for connecting the CPU 51 to the control signal terminals on the first connector 58; and control signal lines L57 to L59 for connecting the CPU 51 to the control signal terminals on the second connector 59. In the first transfer mode, the control signal lines L51 to L53 and L60 to L64 are connected, thereby allowing the control signals from the host computer 10 to be directly transferred to the laser printer 20 via the first connector 58, control signal lines L51 to L53, and the second connector 59, and vice versa via the second connector 59, control signal lines L60 to L64 and the first connector 58. In the second transfer mode, the control signal lines L65 to L69 are connected, thereby allowing the control signals from the CPU 51 to be transferred to the host computer 10 via the control signal lines L65 to L69 and the first connector 58. In the third transfer mode, the control signal lines L57 to L59 are connected, thereby allowing the control signals from the CPU 51 to be transferred to the laser printer 20 via the control signal lines L57 to L59 and the second connector 59.

On the other hand, when the copy switch 34 is manipulated, the DTC circuit 60 is forcibly switched to the third transfer mode as described above. The "H" level printer busy signal P.BSYA is transmitted to the host computer 10 via the control signal line L62 in order to instruct the host computer 10 to stop transmission of the image data to the laser printer 20. Therefore, the original document can be copied only by the manipulation of the copy switch 34. The DTC circuit 60 is changed to the third transfer mode without special operations to this effect other than manipulating the copy switch 34.

The first connector 58 of the DTC circuit 60 is configured to be exactly the same as the configuration of the connector 21 provided in the laser printer 20. Also, the second connector 59 is configured to be exactly the same as the configuration of the connector 11 of the host computer 10. The host computer 10 and the image scanner 20 are connected using a connection cable 15 having at one end a 25-pin DSUB connector 16 and at the other end a 36-pin Amphenol connector 17. The same connection cable 15 can be used to connect the laser printer 20 and the image scanner 30. Therefore, even if the connector 11 of the host computer 10 and the connector 21 of the laser printer 20 do not match, the same connection cable used for connection of the host computer 10 to the first connector 58 can be used for connection of the laser printer 20 to the second connector 59.

While only one exemplary embodiment of this invention has been described in detail, those skilled in the art will recognize that there are many possible modifications and variations which may be made in this exemplary embodiment while yet retaining many of the novel features and advantages of the invention. For example, configuration of the data line change-over circuits 70 in the DTC circuit 60 can be simplified with the use of relays. While in the exemplary embodiment, eight data lines are provided for performing 8-bit parallel transfer, the number of data lines can be increased to perform, for example, 16-bit parallel data transfer. Further, although the active signal ACTB, host clock signal H.CLKB, host busy signal H.BSYB and the like are used as the control signals in the embodiment, relevant control signals and the signal lines therefor need to be used so as to meet the communication format to be used.

In the exemplary embodiment, the DTC circuit 60 is incorporated in the image scanner 30. However, the DTC circuit 60 may be provided separately from the image scanner 30. In this case, the DTC circuit 60 needs to be provided with a third connector for connection through a third connection cable to the image scanner 30.

What is claimed is:

1. An image capturing device comprising:

reading means for reading images on an original document and producing data representative of the images on the original document;

control means for controlling said reading means and performing data processing of the data produced from said reading means, said control means outputting image data corresponding to the data produced from said reading means;

a first connector connected through a first connection cable to a host computer, said first connector having at least one data terminal and at least one control terminal;

a second connector connected through a second connection cable to a printer, said second connector having at least one data terminal and at least one control terminal; and data transfer control means selectively set to one of a first transfer mode, a second transfer mode, and a third transfer mode, wherein in the first transfer mode, an image data sent from the host computer through said first connector is sent to the printer through said second connector, in the second transfer mode, the image data produced from said reading means is sent to the host computer through said first connector, and in the third transfer mode, the image data produced from said reading means is sent to the printer through said second connector, said data transfer control means comprising:

a first data line connecting the data terminal on said first connector to the data terminal on said second connector, a second data line connecting said control means to the data terminal on said first connector;

a third data line connecting said control means to the data terminal on said second connector; and data line change-over means for selectively enabling one of said first data line, said second data line, and said third data line and disabling remaining two data lines, wherein said first data line is enabled when said data transfer control means is in the first transfer mode, said second data line is enabled when said data transfer control means is in the second transfer mode, and said third data line is enabled when said data transfer control means is in the third transfer mode.

2. An image capturing device according to claim 1, wherein said data transfer control means further comprises:

a first control signal line connecting the control terminal on said first connector to the control terminal on said second connector;

a second control signal line connecting the control terminal on said first connector to said control means;

a third control signal line connecting the control terminal on said second connector to said control means; and control signal line change-over means for selectively enabling one of said first control signal line, said second control signal line, and said third control signal line and disabling remaining two control signal lines, wherein said first control signal line is enabled when said data transfer control means is in the first transfer mode, said second control line is enabled when said data transfer control means is in the second transfer mode, and said third control line is enabled when said data transfer control means is in the third transfer mode.

3. An image capturing device according to claim 1, wherein said control means outputs multi-bit image data in parallel mode, and said first connector has a plurality of data terminals for transmitting and receiving the multi-bit image data in parallel mode, and wherein said second connector has a plurality of data terminals for receiving the multi-bit image data in parallel mode separately from said host computer and said control means.

4. An image capturing device according to claim 1, wherein said host computer has a connector connected to said first connector, and said printer has a connector connected to said second connector, wherein said first connector and the connector of said printer are identically configured, and said second connector and the connector of said host computer are identically configured.

5. An image data transfer system comprising:
  an image capturing device having reading means for reading images on an original document and producing first image data;
  a host computer connected through a first connection cable to said image capturing device, said host computer outputting second image data to said image capturing device; and
  a printer connected through a second connection cable to said image capturing device, wherein said image capturing device comprises:
    a first connector connected through the first connection cable to said host computer, said first connector having at least one data terminal and at least one control terminal;
    a second connector connected through the second connection cable to said printer said second connector having at least one data terminal and at least one control terminal; and
    data transfer control means selectively set to one of a first transfer mode, a second transfer mode, and a third transfer mode, wherein in the first transfer mode, the second image data sent from said host computer through said first connector is sent to said printer through said second connector, in the second transfer mode, the first image data produced from said reading means is sent to said host computer through said first connector, and in the third transfer mode, the first image data produced from said reading means is sent to said printer through said second connector, said data transfer control means comprising:
      a first data line connecting the data terminal on said first connector to the data terminal on said second connector;
      a second data line connecting said reading means to the data terminal on said first connector;
      a third data line connecting said reading means to the data terminal on said second connector; and
      data line change-over means for selectively enabling one of said first data line said second data lines and said third data line and disabling remaining two data lines, wherein said first data line is enabled when said data transfer control means is in the first transfer modes said second data line is enabled when said data transfer control means is in the second transfer mode, and said third data line is enabled when said data transfer control means is in the third transfer mode.

6. An image data transfer system according to claim 5, wherein said data transfer control means selects the first transfer mode as a default setting.

7. An image data transfer system according to claim 6, wherein said data transfer control means forcibly switches the first transfer mode to the second transfer mode when a predetermined transfer mode change-over command data is received from said host computer.

8. An image data transfer system according to claim 6, wherein said image capturing device includes a switch, and wherein when said switch is operated, said data transfer control means forcibly changes the first transfer mode to the third transfer mode and sends a busy signal to said host computer to thereby instruct said host computer to stop transmitting the second image data to said printer.

9. A data transfer control circuit for use in combination with a host computer, a printer, and an image capturing device, said circuit comprising:
  a first connector connected through a first connection cable to the host computer said first connector having at least one data terminal and at least one control terminal;
  a second connector connected through a second connection cable to the printer said second connector having at least one data terminal and at least one control terminal;
  a third connector connected through a third connection cable to the image capturing device, said third connector having at least one data terminal and at least one control terminal;
  mode setting means for selectively setting one of a first transfer mode, a second transfer mode, and a third transfer mode; and
  connection means for connecting, in the first transfer mode, the host computer to the printer, in the second transfer mode, the image capturing device to the host computer, and in the third transfer mode, the image capturing device to the printer, said connection means comprising:
    a first data line connecting the data terminal on said first connector to the data terminal on said second connector;
    a second data line connecting the data terminal on said third connector to the data terminal on said first connector;
    a third data line connecting the data terminal on said third connector to the data terminal on said second connector; and
    data line change-over means for selectively enabling one of said first data line, said second data line, and said third data line and disabling remaining two data lines, wherein said first data line is enabled in the first transfer mode, said second data line is enabled in the second transfer mode, and said third data line is enabled in the third transfer mode.

10. A data transfer control circuit according to claim 9, wherein said mode setting means has a default setting function for setting the first transfer mode as a default setting.

11. A data transfer control circuit according to claim 10, wherein the host computer comprises means for outputting a transfer mode change command, and wherein in response to the transfer mode change command, said mode setting means changes the default setting to the second transfer mode.

12. A data transfer control circuit according to claim 11, wherein said mode setting means changes the second transfer mode to the first transfer mode when data communication between the image capturing device and the host computer is terminated.

13. A data transfer control circuit according to claim 12, wherein the image capturing device further comprises switch means for producing a print command, and wherein in response to the transfer mode change command and the print command, said mode setting means changes the default setting to the third transfer mode.

14. A data transfer control circuit according to claim 13, wherein said mode setting means changes the third transfer mode to the first transfer mode when data communication between the image capturing device and the printer is terminated.

* * * * *